(12) United States Patent
Hurley

(10) Patent No.: US 6,775,444 B1
(45) Date of Patent: Aug. 10, 2004

(54) FIBER OPTIC ASSEMBLIES AND METHODS OF MAKING THE SAME

(75) Inventor: William C. Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/377,221

(22) Filed: Feb. 28, 2003

(51) Int. Cl.[7] ............................................... G02B 6/44
(52) U.S. Cl. ...................................... 385/104; 385/108
(58) Field of Search ................................ 385/103, 104, 385/106, 109, 111

(56) References Cited

U.S. PATENT DOCUMENTS

| | | | |
|---|---|---|---|
| 4,325,212 A | 4/1982 | Hope nee Swiecicki | 57/15 |
| 4,828,352 A | 5/1989 | Kraft | 350/96.23 |
| 5,013,127 A | 5/1991 | Bernard | 350/96.23 |
| 5,224,192 A | 6/1993 | Wagman | 385/112 |
| 5,343,549 A * | 8/1994 | Nave et al. | 385/103 |
| 5,390,273 A * | 2/1995 | Rahman et al. | 385/112 |
| 5,729,966 A | 3/1998 | Grulick | 57/293 |
| 5,925,462 A * | 7/1999 | Girgis | 428/392 |
| 6,167,178 A | 12/2000 | Nave | 385/103 |
| 6,256,439 B1 * | 7/2001 | Brown et al. | 385/114 |
| 6,293,081 B1 | 9/2001 | Grulick et al. | 57/293 |
| 6,389,204 B1 | 5/2002 | Hurley | 385/102 |
| 6,389,787 B1 | 5/2002 | Greenwood et al. | 57/66 |
| 2003/0002830 A1 * | 1/2003 | Petryszak | 385/111 |
| 2003/0082380 A1 * | 5/2003 | Hager et al. | 428/375 |
| 2003/0202758 A1 * | 10/2003 | Ardouin | 385/111 |

* cited by examiner

Primary Examiner—Chandrika Prasad
(74) Attorney, Agent, or Firm—Michael E. Carroll. Jr.

(57) ABSTRACT

A fiber optic assembly and method of manufacturing the same include at least one central strength member, a first layer of optical fibers, a second layer of optical fibers, and a jacket. The first and second layers of optical fibers are adjoining layers formed by a common strander. Optical fibers can migrate between the adjoining two layers at different longitudinal positions in the cable without entanglement among themselves. Additionally, the optical fibers in adjoining layers can have the same lay length and same phase relationship.

41 Claims, 8 Drawing Sheets

FIBER OPTIC ASSEMBLIES AND METHODS OF MAKING THE SAME

FIELD OF THE INVENTION

The present invention relates to fiber optic assemblies and methods of making of the same. More specifically, the invention relates to fiber optic assemblies that are manufactured using a single optical fiber strander.

BACKGROUND OF THE INVENTION

FIGS. 1 and 2 illustrate prior art fiber optic cables containing multiple tight-buffered optical fibers. FIG. 1 depicts a single layer cable 100 that includes multiple tight-buffered optical fibers 101 stranded around a rigid over-coated glass reinforced plastic (GRP) strength member 102. Strength member 102 serves as an anti-buckling member protecting the tight-buffered optical fibers 101 from buckling loads applied to the cable 100; however, it makes for a relatively large and stiff cable. As depicted, aramid yarns 103 are stranded around tight-buffered optical fibers 101. Aramid yarns 103 act as a binder to hold the lay of the optical fibers 101 before extruding jacket 104 thereover. Additionally, aramid yarns 103 inhibit jacket 104 from sticking to the tight-buffered optical fibers 103, thereby preserving optical performance. Prior art cable 100 also includes a ripcord 105 for removing jacket 104.

Prior art cable 100 generally performs poorly in crush and bend testing due to rigid central member 102. During crush testing, optical fibers 101 can be pressed against rigid central member 102, thereby affecting the optical performance of the same. During bend testing, rigid central member 102 can interfere with the movement of the optical fibers within a bend segment. The tight-buffered fibers at the outer edge of the bend have to travel a longer distance than the fibers on the inner edge of the bend. To compensate for the differential length during bending, the optical fibers are stranded so that they are adjacent to, for example, the outside of the bend radius for a portion of the bend, then move towards the inside of the bend radius for an adjacent portion of the bend. If the bend length is less than the lay length of the optical fibers, the optical fibers may kink causing optical attenuation. For this prior art cable, the fiber optic lay length can effectively limit the minimum bend radius for which acceptable optical performance can be achieved.

FIGS. 2 and 3 respectively depict a prior art dual-layer optical fiber cable 200 and a stranding portion of the manufacturing line therefor. As shown, this prior art cable requires tight-buffered optical fibers 201 stranded in an inner layer and an outer layer, which are separated by a intermediate layer of aramid yarns 203. Prior art cable 200 also includes a ripcord 206 and a jacket 205. As shown in FIG. 3, the inner layer of optical fibers and the outer layer of optical fibers must be stranded by a first optical fiber strander 301A, and a second optical fiber strander 301B. Thus, this dual-layer prior art cable is more complicated to manufacture than prior art cable 100. However, optical fibers 201 of cable 200 have more freedom to move compared with optical fibers 101 of cable 100, thereby enabling a smaller bend radius than cable 100.

Likewise, as depicted in FIG. 3, a first and a second yarn strander 302A, 302B must also be employed during the manufacture of this prior art dual-layer cable 200. A significant amount of set-up time is required for manufacturing cable 200 because four separate stranders are required for making the same.

Specifically, prior art cable 200 requires three tight-buffered optical fibers 201 stranded around a central aramid yarn 202 using first optical fiber strander 301A, thereby forming the inner layer of optical fibers. Next, intermediate layer of aramid yarns 203 is stranded around the inner layer of tight-buffered optical fibers for maintaining the stranding of the same. Intermediate layer of aramid yarns 203 are stranded using first yarn strander 302A. Thereafter, the outer layer of optical fibers 201 is stranded around intermediate layer of aramid yarns 203 using second optical fiber strander 301B. Then an outer layer of aramid yarns 204 is stranded around the outer layer of optical fibers 203 using second yarn strander 302B. Intermediate layer of aramid yarns 203 and outer layer of aramid yarns 204 hold the tight-buffered optical fibers together and maintain the stranded lay of each respective layer. Moreover, intermediate layer of aramid yarns 203 inhibits tight-buffered optical fibers 203 from migrating between layers. In other words, individual optical fibers are generally confined to one layer, which prevents entanglement of optical fibers 201 between layers, which may cause undesirable optical attenuation.

SUMMARY OF THE INVENTION

The present invention is directed to a fiber optic cable including at least one central strength member, a first layer of optical fibers, a second layer of optical fibers, and a jacket surrounding the first and second layers of optical fibers. Where the at least one central strength member essentially lacks anti-buckling strength. Additionally, the fiber optic cable excludes a separation layer between the first layer of optical fibers and the second layer of optical fibers.

The present invention is also directed to a fiber optic cable including a central member, a first plurality of S-Z stranded optical fibers, a second plurality of S-Z stranded optical fibers, and a jacket disposed about the second plurality of S-Z stranded optical fibers. The first and second layers of S-Z stranded optical fiber being disposed in respective radial locations and having lay lengths that are the same. Additionally, the first plurality of S-Z stranded optical fibers are in phase with the second plurality of S-Z stranded optical fibers along the length of the cable because they are both stranded by a common strander.

The present invention is further directed to a fiber optic assembly including a plurality of optical fibers, and a binder layer. The plurality of optical fibers being stranded around in at least two radially distinct adjoining layers. The optical fibers in the adjoining layers having the same lay length and are in phase so that the optical fibers are free to radially migrate between adjoining layers in response to external forces.

Additionally, the present invention is directed to a method of manufacturing an optical fiber assembly including the steps of paying off a plurality of optical fibers, stranding the plurality of optical fibers in a single stranding process, placing a binder layer about the second layer of optical fibers. The plurality of optical fibers forming a first layer and second adjoining layers.

DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 4A:
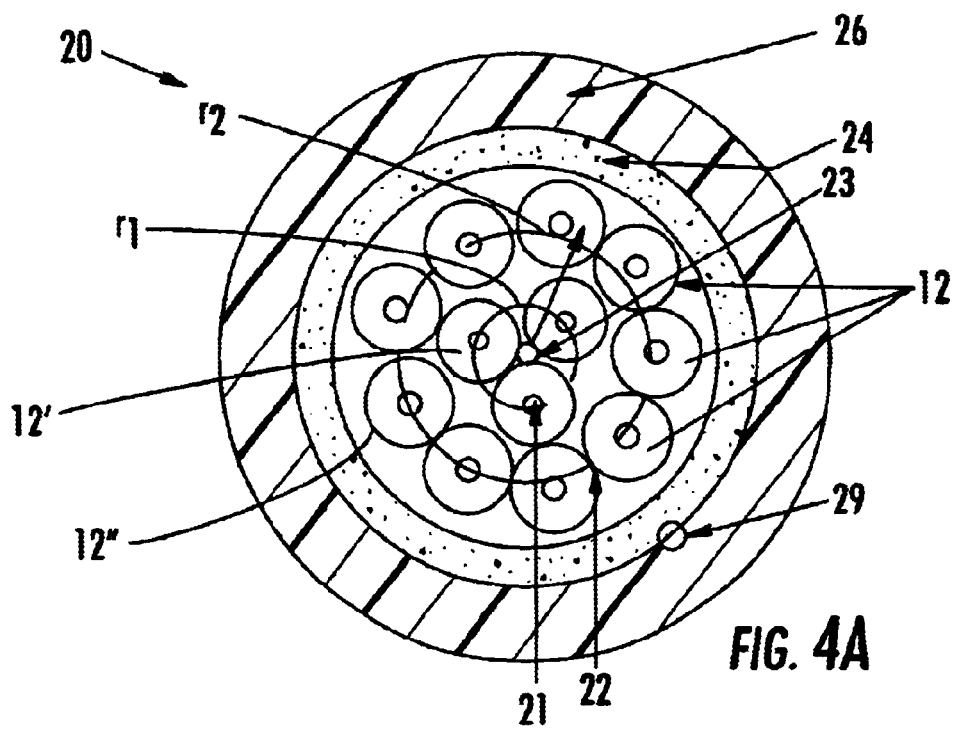
FIG. 4A is a cross-sectional view of a fiber optic assembly according to the present invention.

Illustrated in FIG. 4A is a fiber optic assembly, more specifically, a fiber optic cable 20 (hereinafter cable) according to the concepts of the present invention. Cable 20 includes a central member 23, a first layer of optical fibers 21, a second layer of optical fibers 22, a binding layer 24, and a jacket 26. In this embodiment, first layer of optical fibers 21 includes three tight-buffered optical fibers 12 that are stranded around central member(s) 23, thereby forming an inner layer of optical fibers at a first radial location r1. In this embodiment, central member(s) 23 is a central strength member such as a tensile yarn that essentially lacks anti-buckling strength. Tensile yarns include materials such as an aramid, fiberglass, ultra-high molecular weight polyethylene, and polyparaphenylenebenzobisoxazole, commonly referred to a PBO; however, other tensile yarns can be used. Second layer of optical fibers 22 form an adjoining layer with the first layer 21 of optical fibers at a second radial location r2.

As used herein, adjoining layer means that first layer 21 and second layer 22 are able to contact each other and are not divided by a separation component, binder, or layer such as tapes, yarns, or fibers. However, a thin film or layer of material such as talc, wax, or grease can be disposed on the optical fibers for use as a lubricant therebetween. For instance, cable 20 does not include a separation component, binder, or layer such as the intermediate layer of aramid yarns 203 disposed between layers of optical fibers 201 as employed in prior art cable 200.

As depicted, cable 20 also includes binding layer 24 formed by tensile yarns such as aramid yarns that are stranded around the second layer of optical fibers, thereby holding the stranded optical fibers together and providing coverage to inhibit the tight-buffered optical fibers from sticking to jacket 26 during extrusion. Additionally, to reduce the quantity of tensile yarns required a separation layer such as a talc or water-swellable powder, or a tape can be applied to inhibit jacket 26 from sticking to the tight-buffered optical fibers during extrusion. Cable 20 can include other cable components such as ripcords, water-swellable elements, or other suitable components.

Figure 9:
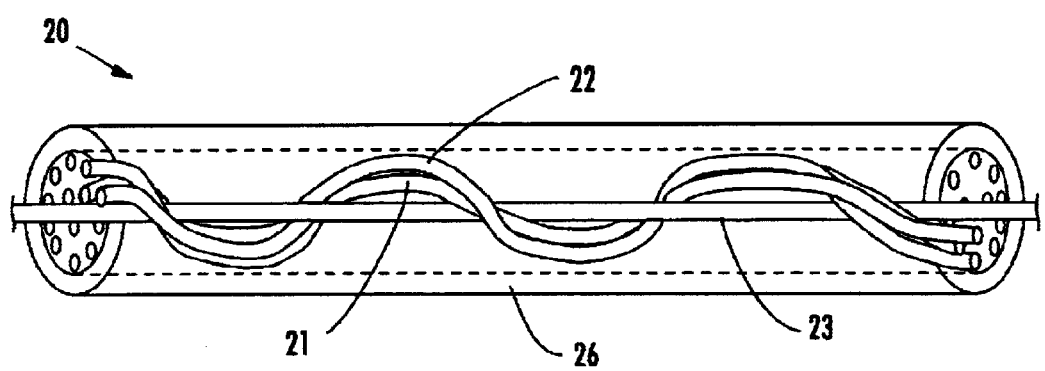
FIG. 9 is a side phantom view of an S-Z stranded fiber optic assembly showing stranding characteristics according to the concepts of the present invention.

Cables according to the concepts of the present invention have at least two adjoining layers of optical fibers 21, 22 formed by a common strander. Additionally, other embodiments can have more than two adjoining layers. Since the at least two adjoining layers are formed using a common strander, the adjoining layers have the same stranding characteristics. In other words, adjoining layers have the same lay length and are in phase throughout the length of the cable (FIG. 9). For example, a cable of the present invention with S-Z stranding of adjoining layers has switchback points for the adjoining layers disposed at the same locations along the length of the cable. This is because the common optical fiber strander directs the forming of both layers, thereby creating the same stranding characteristics in both layers. Moreover, because the invention has two adjoining layers of optical fibers in phase, the optical fibers may move between layers in an orderly manner without becoming entangled. On the other hand, cables having layers of optical fibers formed with separate stranders generally have a random phase relationship between the layers of optical fibers even if the lay length of the layers are the same.

Figure 4B:
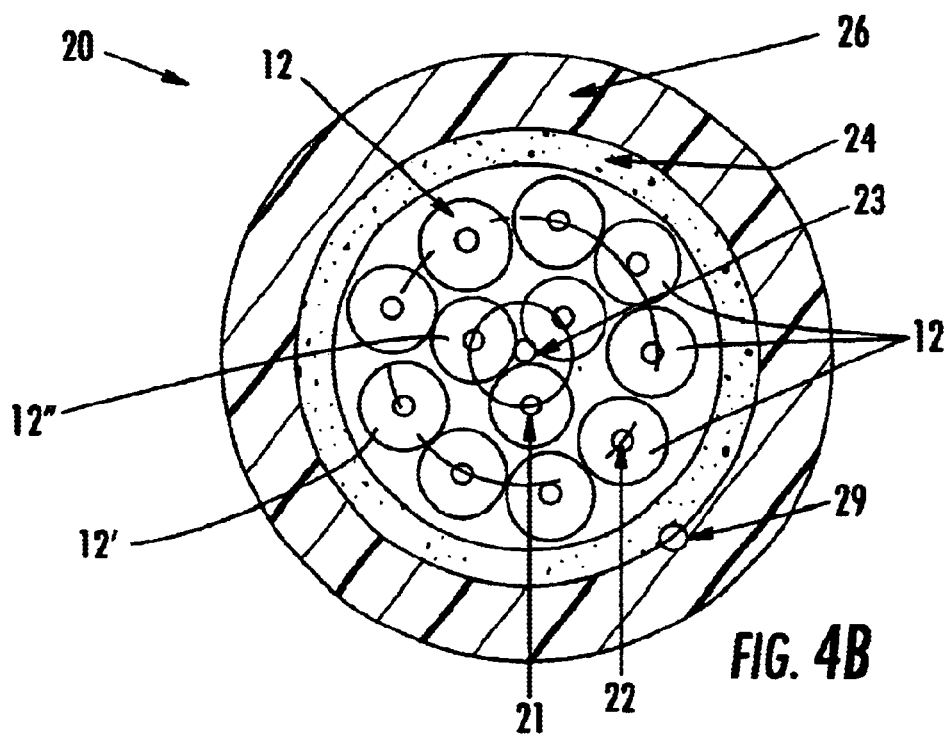
FIG. 4B is a cross-sectional view of the fiber optic assembly of FIG. 4A depicting migration of optical fibers.

Optical fibers in adjoining layers that have the same lay and the same phase can more easily shift or migrate from one layer to another than optical fibers that are not in phase or do not have the same lay. Because an optical fiber is initially in one layer does not mean that it cannot subsequently changes places with an optical fiber in another layer. Moreover, migration of an optical fiber can occur during the manufacture of a cable or in service. For example, FIG. 4A depicts optical fiber 12' disposed in first layer 21 and optical fiber 12" disposed in second layer 22. FIG. 4B depicts optical fiber 12' switching layers with optical fiber 12" at different points along a longitudinal axis of cable 20. Since there is no binding component or separation layer between adjoining fiber layers, optical fibers in different layers can also migrate between layers after the cables are placed in service. For instance, when a cable is bent or is subjected to a side load, fibers in the inner layer can change places with fibers in the outer layer in order to locate to a low stress/strain position. Migration of the optical fibers between layers will be easier and without entanglement among themselves because the optical fibers in both layers are in phase and have the same lay length. This reduction of stress/strain on the optical fibers generally inhibits optical attenuation that might occur if the fibers were more rigidly held in place.

Figure 1:
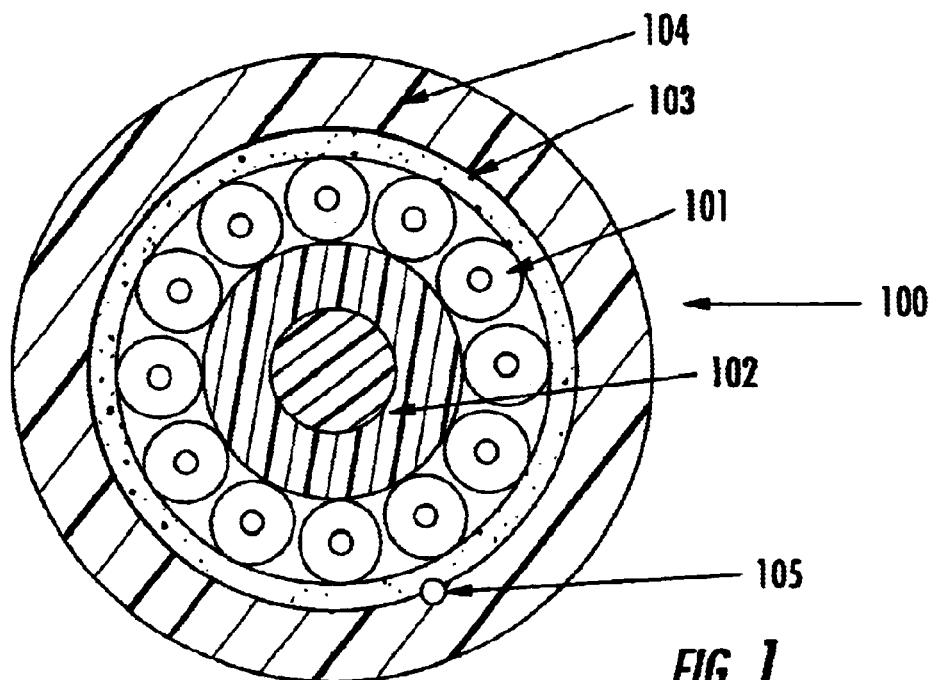
FIG. 1 is a cross-sectional view of a prior art fiber optic cable having a rigid central strength member.
Figure 2:
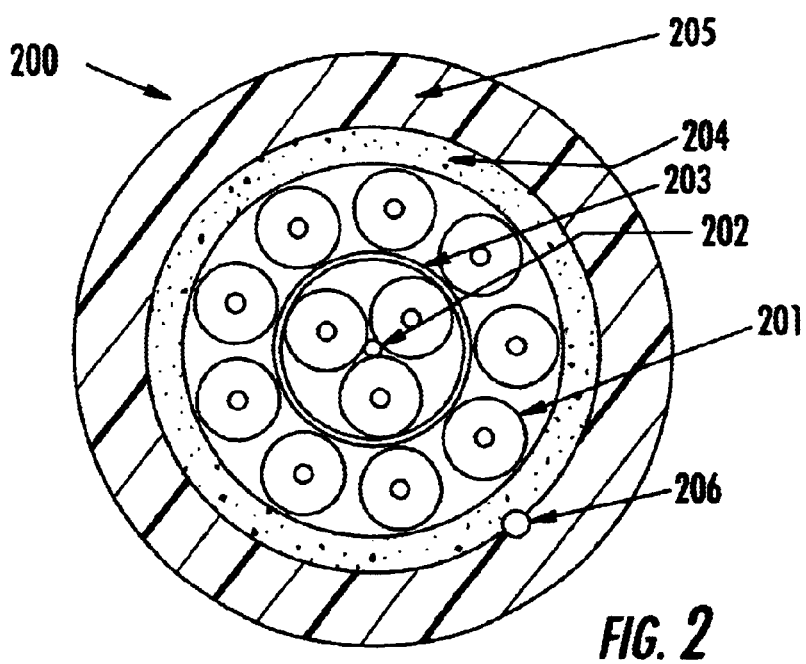
FIG. 2 is a cross-sectional view of a dual-layer prior art fiber optic cable.
Figure 3:
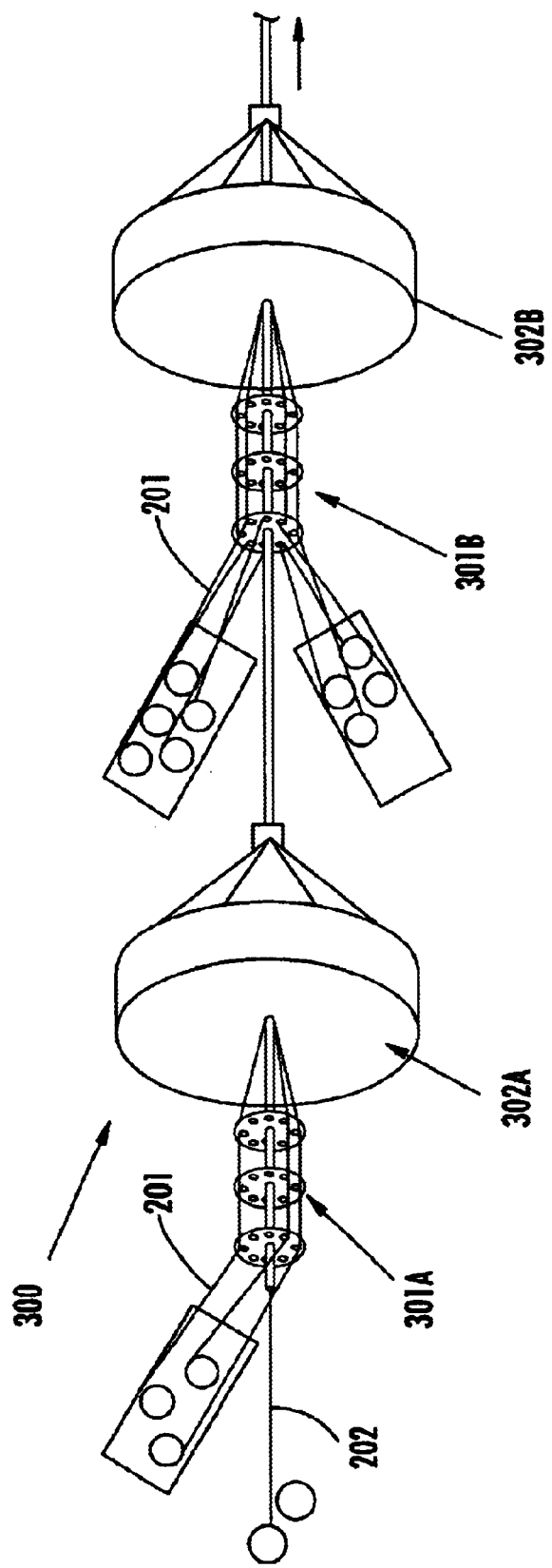
FIG. 3 is a partial schematic of the manufacturing line for fabricating the fiber optic cable shown of FIG. 2.

Cables according to the present invention are advantageous because they can require less material to make, thereby reducing material costs. Additionally, the present invention also reduce the set-up time required for manufacturing equipment compared with prior art cables, thereby reducing labor expenses. Moreover, cables of the present invention require less stranding equipment for the manufacture, thus reducing equipment costs and complexity for manufacture. Specifically, manufacturing cable 20 requires only one optical fiber strander and one yarn strander, rather than two optical fiber stranders and two yarn stranders as shown in FIG. 3 to construct the dual-layer fiber optic cable 200 shown in FIG. 2.

Figure 5:
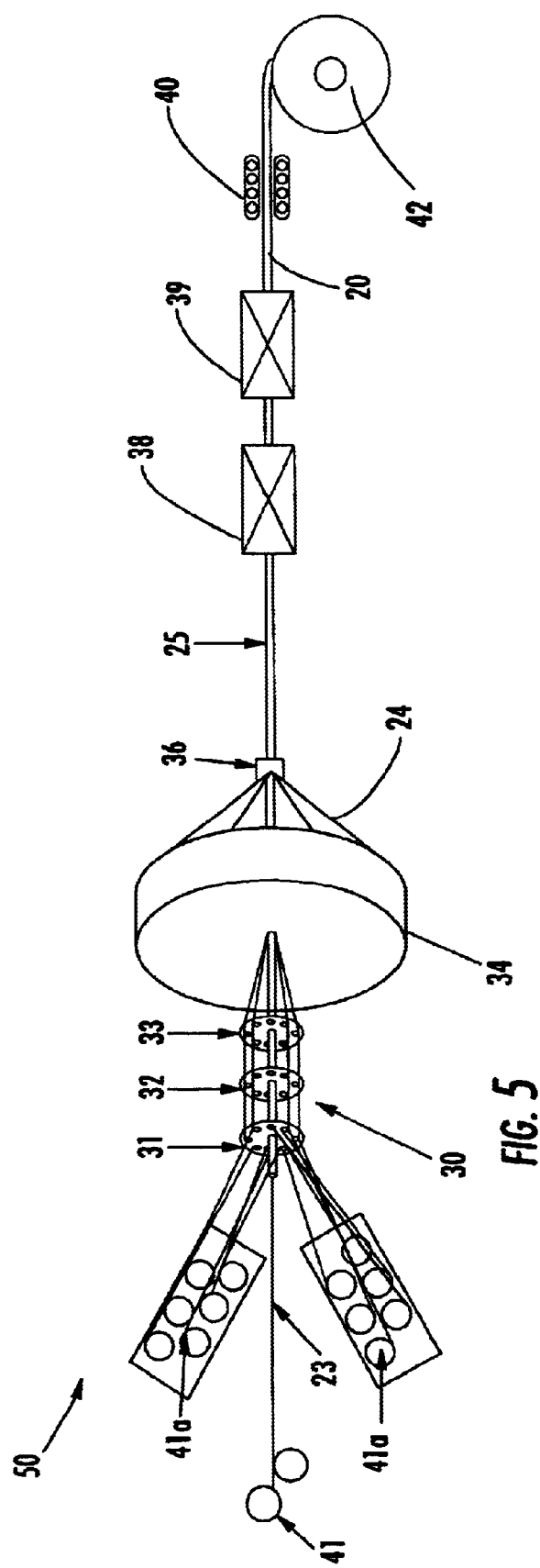
FIG. 5 is a schematic depicting an exemplary manufacturing line for fabricating the fiber optic assembly of FIG. 4A.

Fig. 5 depicts an explanatory manufacturing line 50 according to the present invention for producing cable 20. Manufacturing cable 20 includes the steps of paying off central member 23 from a reel 41 and paying off a plurality of optical fibers 12 from respective reels 41a. In this embodiment, central member 23 essentially lacks anti-buckling strength, but in other embodiments it may have anti-buckling strength optical fibers are stranded about central member 23 in a single stranding process using a common optical fiber strander 30, thereby forming a first layer of optical fibers 21 and a second layer of optical fibers 22 that form adjoining layers. Cable 20 excludes a separation component between the first and second layer of optical fibers 21, 22. Thereafter, binding layer 24 is placed about the second layer of optical fibers 22; for example, a layer of tensile yarns is stranded therearound, thereby forming a cable core 25 as it passes through a closing die 36. Finally, cable jacket 26 is extruded around cable core 25.

Figure 6B:
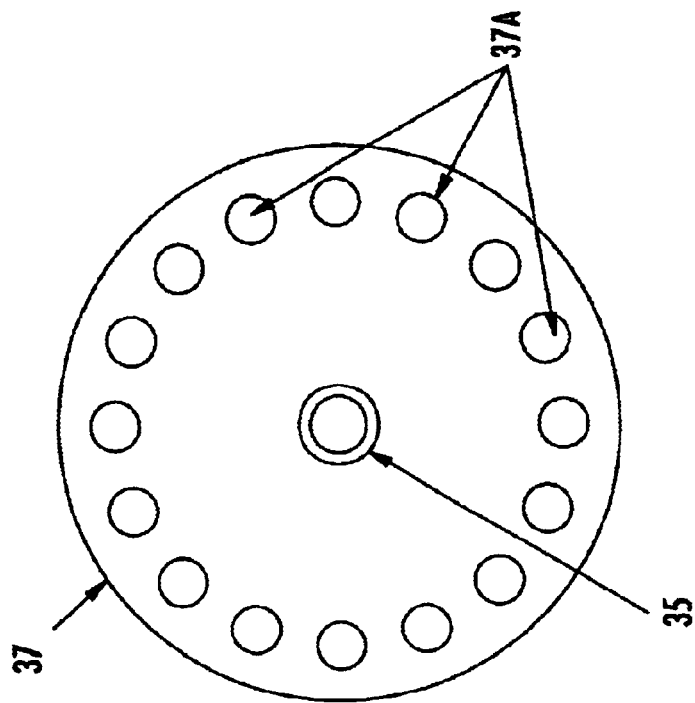
FIG. 6B is an end view of FIG. 6.
Figure 6A:
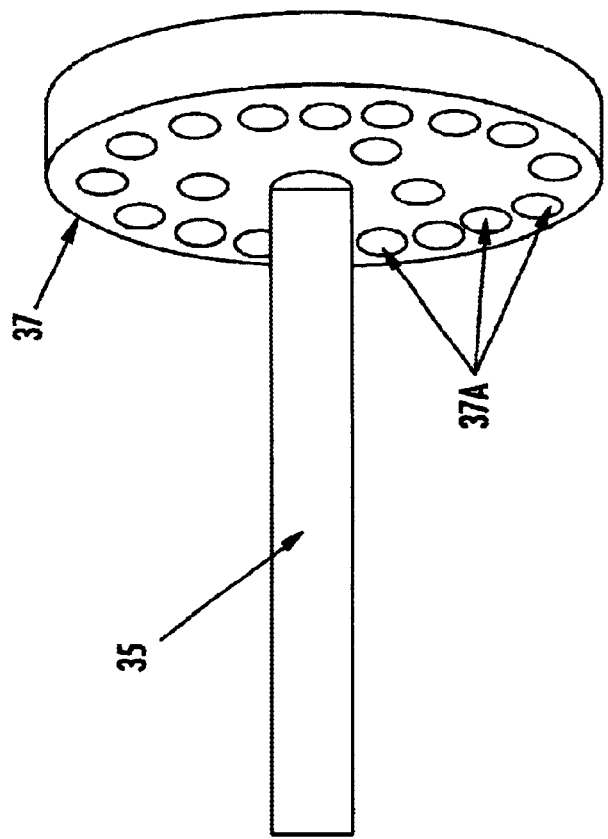
FIG. 6A is a side view depicting a portion of a strander used in the manufacturing line of FIG. 5.

More specifically, central member 23 and optical fibers 12 are routed to predetermined positions in common optical fiber strander 30. Optical fiber strander 30 comprises a plurality of discs; however, only three discs 31, 32, 33 are visible and represented in FIG. 5 for simplicity. Each disc has a plurality of holes as shown in FIG. 5 for routing components therethrough. Specifically, optical fiber strander 30 includes a stationary guide disc 31, and rotatable discs 32, 33 before a yarn strander 34 and a rotatable disc 37 (not visible in FIG. 5) after yarn strander 34; however, any suitable strander can be used. Optical fibers 12 are routed through predetermined holes in stationary guide disc 31 and thereafter proceed to through respective holes in rotatable discs 32, 33, 37. Rotatable discs 32, 33, 37 provide stranding by rotating relative to the stationary guide disc 31 and relative to the central member 23, which is advancing through a strander shaft 35 (FIG. 6A). Optical fiber strander 30 is capable of S-Z standing optical fibers 12; however, other suitable stranders can be used for helical stranding configurations.

Generally speaking, during the manufacture of cable 20 central member(s) 23 will be paid off with a higher tension than the optical fibers 12. The pay-off tensions between central member(s) 23 and optical fibers should maintain the fiber-stranding configuration such as S-Z stranding, but not over stress optical fibers 12. By way of example, the tension in central member(s) 23 is in the relatively high range of about 600 grams to about 1000 grams. Whereas, the tension of optical fibers 12 is in the relatively low range of about 150 grams to about 250 grams. The relatively low range for the optical fiber tension inhibits stresses from being induced in the same, thereby inhibiting optical attenuation. Additionally, optical fibers 12 that form first layer 22 will tend to be the optical fibers that have the highest relative tensions because they will pull towards the center of the cable. The remaining nine optical fibers will be dispersed in adjoining second layer 22. If desired, the optical fibers forming first layer 21 can be predetermined by using a relatively higher tension on these optical fibers. Additionally, if during manufacture the relative tensions on optical fibers 12 changes an optical fiber that was in first layer 21 for a portion of cable 20 can migrate to second layer 22 for a portion of cable 20.

Figure 7B:
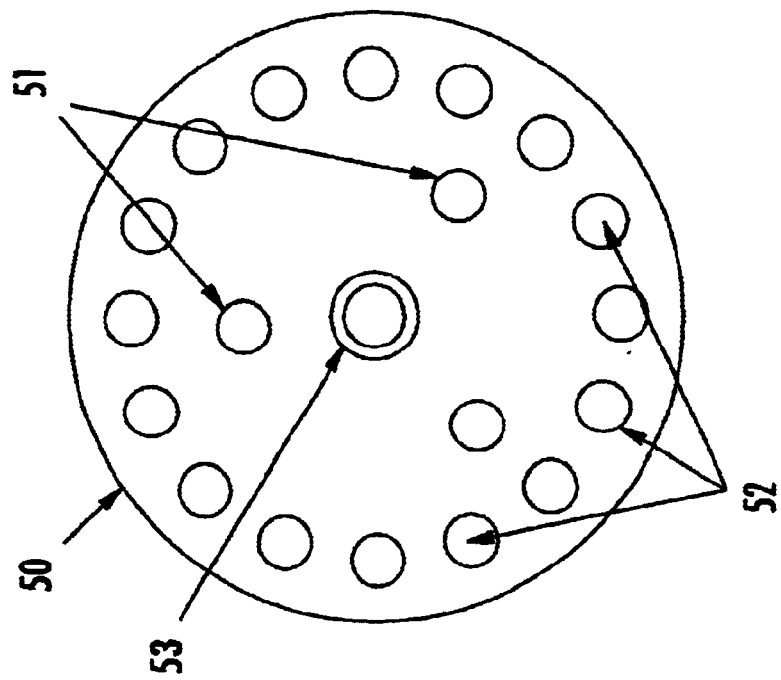
FIGS. 7A and 7B respectively are side and end views depicting a portion of another strander that can be used in the manufacturing line of FIG. 5.
Figure 7A:
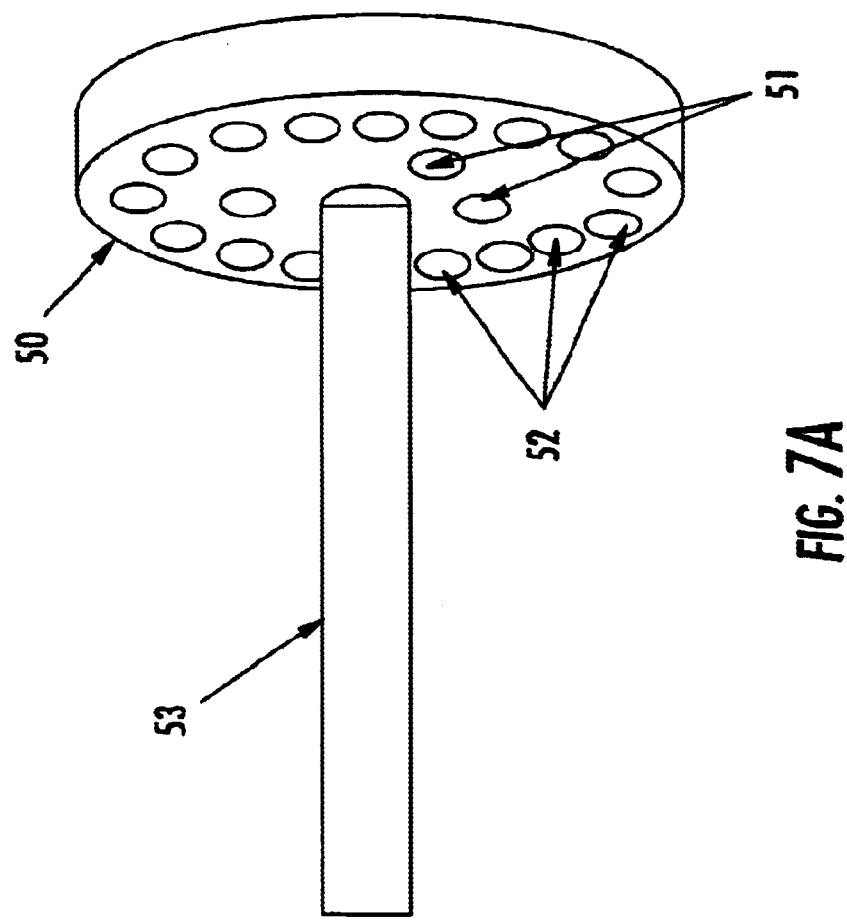

Additionally, FIGS. 7A and 7B depict a typical strander disc 50 that can be employed if predetermined optical fibers should be positioned in inner layer 21. Strander disc 50 is similar to disc 37 because it is intended for use after yarn strander 34 and depicts a strander shaft 53; however, holes 51, 53 are disposed in different locations compared with disc 37. Specifically, strander disc 50 has a plurality of inner holes 51 disposed radially closer to a shaft 53 than a plurality of outer holes 52 disposed adjacent to the periphery of the disc. Thus, the optical fibers desired for first layer 21 are routed through holes 51 and the optical fibers desired for second layer 22 are touted through holes 52.

Thereafter, binder layer 24 is applied to the assembly of stranded optical fibers 12 and central member(s) 23 to inhibit optical fibers 12 from unwinding. In the exemplary manufacturing embodiment, central member(s) 23 having optical fibers 12 stranded therearound, passes through the center of yarn strander 34, which rotates continuously as the assembly of central member(s) 23 and optical fibers 12 are axially advanced through the same. Binder layer 24 is formed from a tensile yarn being paid off yarn strander 34 in a helical manner around optical fibers 12. The tensile yarns are paid-off with a moderate tension, generally in the range of about 350 grams to about 450 grams; however, other suitable ranges can be used as long as it does not cause undue optical attenuation. Additionally, if desired, other suitable cable components can be included in cable core 25 such as a ripcord, water-swellable component, or other suitable cable components.

Next, cable core 25 is formed in closing die 36 located downstream of yarn strander 34, before entering an extruder 38 where jacket 26 is extruded over cable core 25. Thereafter, cable 20 passes through a cooling trough 39 to quench the extruded jacket. A capstan 40 pulls cable 20 to advance the same onto a take up reel 42.

In one embodiment, optical fibers 12 are a plurality of single-mode tight-buffered optical fibers; however, other types or configurations of optical waveguides can be used. For instance, optical fibers 12 need not be tight-buffered, but can be bare optical fibers. Additionally, optical fibers 12 can be multi-mode, pure-mode, erbium doped, polarization-maintaining, other suitable types of light waveguides, and/or combinations thereof. For instance, each optical fiber 12 can include a silica-based core that is operative to transmit light and is surrounded by a silica-based cladding having a lower index of refraction than the core. Additionally, one or more coatings can be applied to optical fiber 12. For example, a soft primary coating surrounds the cladding, and a relatively rigid secondary coating surrounds the primary coating. Optical fibers 12 can also include an identifying means such as ink or other suitable indicia for identification. Suitable optical fibers are commercially available from Corning Incorporated of Corning, N.Y.

As described above, both central member 23 and binder layer 24 comprise tensile yarns, but other suitable central members essentially lacking tensile strength can be used. Tensile yarns are preferred for embodiments using S-Z standing and include aramid, fiberglass, and other suitable tensile yarns. Tensile yarns are more flexible that a rigid central strength member, and essentially lack anti-buckling strength. By way of example, central member(s) 23 is two. 1470 denier aramid yarns. In another embodiment, a single 6600 denier fiberglass yarn is used as central member 23. Moreover, central member 23 and binder layer 24 can comprise the same material or different materials. For example, one or more aramid yarns could be used to form central member(s) 23 and a fiberglass yarn(s) could be employed as binder layer 24. In still other embodiments according to the present invention, the layers of optical fibers are helically stranded without central member 23.

Figure 8:
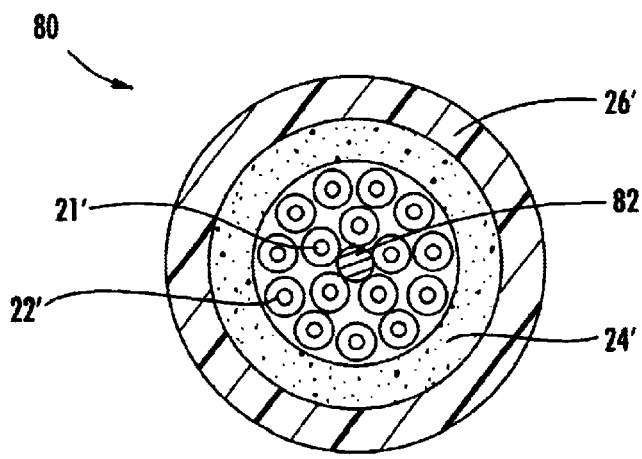
FIG. 8 is a cross-sectional view of a fiber optic assembly according to an embodiment of the present invention.

Additionally, as shown in FIG. 8, embodiments of the present invention can include a rigid central member 82.

Specifically, FIG. 8 illustrates a fiber optic cable 80 having a rigid central member. 82, adjoining layers of optical fiber 21', 22', a binder layer 24', and a jacket 26'. Rigid central member 82 can be formed from materials such as a glass-reinforced plastics (GRP), steel wires, or other suitable components, thereby providing anti-buckling strength to the cable. A rigid central strength member can be larger than a tight-buffered optical fiber, but it may be smaller. Whereas a tensile yarn central strength member (cross sectional area of about 0.28 mm² or less ) will be smaller than a tight-buffered optical fiber (cross-sectional area of about 0.636 mm²). Thus, all things being equal, a cable having a tensile yarn as a central strength member will generally have a smaller cable diameter and be more flexible compared with a cable with a rigid central strength member.

Furthermore, binder layer 24 can be formed from other suitable components and/or materials. For instance, binder layer 24 can be a tape formed including-materials such as mica, mylar, a water-swellable substance, or other suitable materials having a binder thread therearound for securing the same. Moreover, binder layer 24 can be one or more threads or yarns that are stranded or stitched around the optical fibers to secure the stranding of the optical fibers. Additionally, threads or yarns can included a water-swellable substance.

Figure 10:
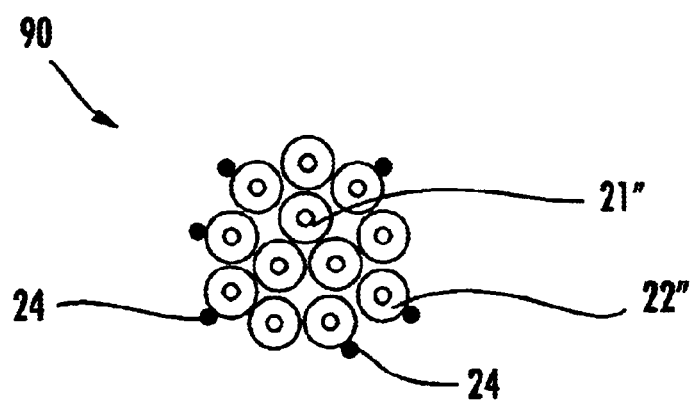
FIG. 10 is a cross-sectional view of another fiber optic assembly according to the present invention.
Figure 11:
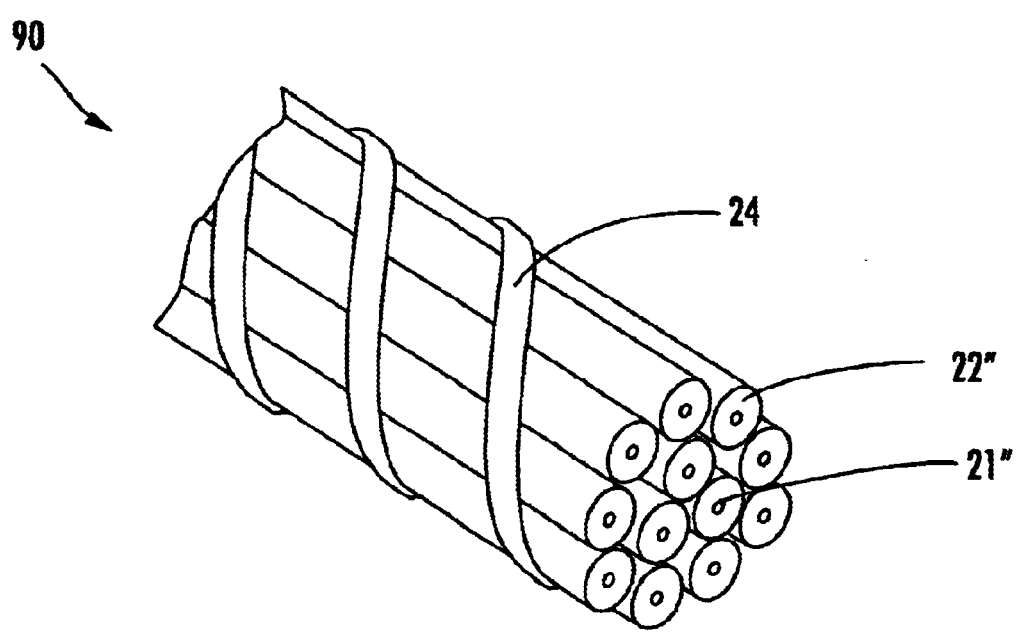
FIG. 11 is a perspective view of the fiber optic assembly of FIG. 10.

For instance, FIGS. 10 and 11 illustrate a fiber optic assembly 90, more specifically, a fiber optic bundle according to the concepts of the present invention. Fiber optic assembly 90 includes, a first layer of optical fibers 21", a second layer of optical fibers 22", and a binder layer 24. In this embodiment, first and second layers of optical fibers 21", 22" are adjoining layers. Moreover, the binder layer 24 and optical fibers 12 are both helically stranded. Specifically, a plurality of binder threads form binder layer 24 and are contra-helically stranded around the optical fibers, but in other embodiments binder layer 24 can be stitched therearound to secure the stranding of the optical fibers. Typically, the lay length of the helically wrapped binder threads is larger than the lay length of the optical fibers, but other suitable lay lengths are possible. Other configurations include S-Z stranded optical fibers, with or without a central member 23 (not shown), having a lay length in the range of about 100 mm to about 600 mm. With S-Z stranding, binder threads are stranded to have a contra-helical lay with respect to the optical fibers. Additionally, one or more fiber optic assemblies 90 can form a portion of a fiber optic cable having a jacket therearound.

Jacket 26 and/or tight-buffer materials are preferably formed from a polymeric material such as PVC, polyethylene, PVDF, or nylon. However, other suitable materials may be used. Additionally, jacket 26 and/or tight buffer can contain suitable additives such as flame retardant materials to enable various burn ratings for the cable, such as plenum, riser, or low smoke zero halogen. For example, jacket and/or buffer layer 14 can be flame resistant as disclosed by U.S. Pat. No. 6,167,178, the subject matter of which is incorporated herein by reference. For example, jacket 26 and/or tight-buffer material can include aluminum trihydrate, antimony trioxide, or other suitable additives to improve the flame resistance of buffer layer 14. Additionally, jacket 26 may include carbon black to impart resistance to sunlight.

Many modifications and other embodiments of the present invention, within the scope of the appended claims, will become apparent to a skilled artisan. For example, the concepts of the present invention can be practiced with cable configurations having any suitable numbers of optical fibers. Likewise, cables according to the concepts of the present invention can include more than two layers of optical fibers. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to tight-buffered, silica-based optical fibers, but the inventive concepts of the present invention are applicable to other suitable optical waveguides and fiber optic cable configurations as well.

That which is claimed:

1. A fiber optic cable comprising:
   at least one central strength member, the at least one central strength member essentially lacking anti-buckling strength;
   a first layer of optical fibers;
   a second layer of optical fibers, wherein the fiber optic cable excludes a separation layer between the first layer of optical fibers and the second layer of optical fibers; and
   a jacket surrounding the first and second layers of optical fibers.

2. The fiber optic cable of claim 1, further comprising a binding layer disposed between the second layer of optical fibers and the jacket.

3. The fiber optic cable of claim 2, the binding layer being selected from the group consisting of at least one yarn, tape, and thread.

4. The fiber optic cable of claim 1 wherein the first and second layers of optical fibers are stranded.

5. The fiber optic table of claim 4 wherein the first and second layers of stranded optical fibers have the same lay length and are in phase.

6. The fiber optic cable of claim 1 wherein the optical fibers comprise tight-buffered optical fibers.

7. The fiber optic cable of claim 1 wherein the central strength member comprises a tensile yarn.

8. The fiber optic cable of claim 7 including additional tensile yarns stranded around the optical fibers.

9. The fiber optic cable of claim 1 wherein at least one optical fiber in the first layer of optical fibers shifts to the second layer of optical fibers along a length of the cable and at least one optical fiber in the second layer of optical fibers shifts to the first layer along a length of the cable.

10. The fiber optic cable of claim 1 wherein optical fibers can shift between the first and second layers when the cable is bent.

11. The fiber optic cable of claim 1 wherein the central strength member has a smaller cross-sectional area than one of the optical fibers.

12. The fiber optic cable of claim 1 wherein the jacket comprises a flame-retardant material.

13. A fiber optic cable comprising;
   a central member;
   a first plurality of S-Z stranded optical fibers being disposed in a first radial location, having a first lay length;
   a second plurality of S-Z stranded optical fibers being disposed in a second radial location, having a second lay length that is the same as the first lay length, wherein the first plurality of S-Z stranded optical fibers is in phase with the second plurality of S-Z stranded optical fibers along the length of the cable because they are stranded by a common strander; and a jacket disposed about the second plurality of S-Z stranded optical fibers.

14. The fiber optic cable of claim 13 including a binder layer around the second layer of S-Z stranded optical fibers for securing the optical fibers.

15. The fiber optic cable of claim 14 wherein the binder layer includes tensile yarns.

16. The fiber optic cable of claim 14 wherein the binder layer is selected from the group consisting of at least one tape, yarn, and thread.

17. The fiber optic cable of claim 14 wherein the binder layer is stranded.

18. The fiber optic cable of claim 13 wherein the optical fibers are tight-buffered.

19. The fiber optic cable of claim 13 wherein the first plurality of S-Z stranded optical fibers and the second plurality of S-Z stranded optical fibers form adjoining layers.

20. The fiber optic cable of claim 13 wherein the radial location of at least one optical fiber changes along the fiber optic cable.

21. The fiber optic cable of claim 20 wherein the radial location of at least one optical fiber changes at a switchback position.

22. The fiber optic cable of claim 13 wherein two optical fibers change radial locations along the length of the cable.

23. The fiber optic cable of claim 13 wherein the central member is selected from the group consisting of a tensile yarn and a rigid member.

24. The fiber optic cable of claim 13 wherein the jacket comprises a flame-retardant material.

25. A fiber optic assembly comprising:
a plurality of optical fibers, the plurality of optical fibers being stranded around in at least two radially distinct adjoining layers, the optical fibers in the adjoining layers having the same lay length and are in phase, wherein the optical fibers are free to radially migrate between adjoining layers in response to external forces; and
a binder layer.

26. The fiber optic assembly of claim 25 the binder layer being one or more threads.

27. The fiber optic assembly of claim 25 the plurality of optical fibers being tight-buffered.

28. The fiber optic assembly of claim 25 further being a portion of a fiber optic cable.

29. The fiber optic assembly of claim 25 the plurality of optical fibers being stranded according to the group consisting of S-Z stranding and helical stranding.

30. The fiber optic assembly of claim 25 further comprising a cable jacket disposed about the binder layer.

31. The fiber optic assembly of claim 25 further comprising a central member, the plurality of the optical fibers being stranded around the central member.

32. The fiber optic assembly of claim 26 the central member being a tensile yarn.

33. A method of manufacturing an optical fiber assembly comprising the steps of:
paying off a plurality of optical fibers;
stranding the plurality of optical fibers in a single stranding process, wherein the plurality of optical fibers form a first layer of optical fibers and a second layer of optical fibers to form adjoining layers; and
placing a binder layer about the second layer of optical fibers.

34. The method of claim 33 further comprising the step of extruding a jacket about the plurality of optical fibers.

35. The method of claim 34 wherein the step of extruding a jacket comprises extruding a flame-retardant material.

36. The method of claim 33 further comprising paying off at least one central member, the central member essentially lacking anti-buckling strength, wherein the plurality of optical fibers are stranded about the central member.

37. The method of claim 36 wherein the step of paying off at least one central member comprises the step of paying off a tensile yarn.

38. The method of claim 36 wherein a pay-off tension of the central member is greater than a pay-off tension of the plurality of optical fibers.

39. The method of claim 33 wherein the step of placing a binder layer about the second layer of optical fibers comprises the step of stranding at least one tensile yarn.

40. The method of claim 33 wherein optical fibers in the first layer and the second layer are free to migrate to the other adjoining layer.

41. The method of claim 33 wherein the step of stranding a plurality of optical fibers comprises stranding selected from the group consisting of S-Z stranding and helical stranding.

* * * * *